United States Patent
Teterin et al.

(10) Patent No.: US 7,587,563 B1
(45) Date of Patent: Sep. 8, 2009

(54) METHOD AND SYSTEM TO MAKE A READ-ONLY FILE SYSTEM APPEAR TO BE WRITEABLE

(75) Inventors: Boris Teterin, Redwood City, CA (US); Manish Dhirajlal Patel, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 239 days.

(21) Appl. No.: 11/485,260

(22) Filed: Jul. 11, 2006

(51) Int. Cl.
   *G06F 13/38* (2006.01)
(52) U.S. Cl. ...................... 711/162; 711/161
(58) Field of Classification Search ............... 711/161, 711/162
   See application file for complete search history.

(56) References Cited

U.S. PATENT DOCUMENTS 5,819,292 A   10/1998   Hitz et al.
2002/0083037 A1*   6/2002   Lewis et al. .................. 707/1
2005/0246397 A1   11/2005   Edwards et al.
2006/0179261 A1*   8/2006   Rajan ........................ 711/162
2007/0226270 A1*   9/2007   Sarma et al. ................ 707/201

OTHER PUBLICATIONS

Miroslav Klivansky, "A Thorough Introduction to FlexCloneTM Volumes," TR3347, Oct. 2004, pp. 1-35, Network Appliance Inc., USA.

* cited by examiner

*Primary Examiner*—Hyung S Sough
*Assistant Examiner*—Shawn Eland
(74) *Attorney, Agent, or Firm*—Blakely, Sokoloff, Taylor & Zafman LLP

(57) ABSTRACT

A writeable clone of a read-only dataset, e.g., an RPPI of a file system, a mirror file system, etc., is created to make the read-only dataset appear from a client's perspective to be modifiable/writeable, yet without actually modifying the read-only dataset itself. Any change attempted to be made on the read-only dataset is stored in the writeable clone. In one embodiment, the clone shares data blocks with the read-only dataset.

20 Claims, 7 Drawing Sheets

FIG. 4  Prior Art

METHOD AND SYSTEM TO MAKE A READ-ONLY FILE SYSTEM APPEAR TO BE WRITEABLE

FIELD OF THE INVENTION

At least one embodiment of the present invention pertains to storage systems, and more particularly, to make a read-only file system appear to be writeable.

BACKGROUND

Various forms of network-based storage systems are known today. These forms include network attached storage (NAS), storage area networks (SANs), and others. Network storage systems are commonly used for a variety of purposes, such as providing multiple users with access to shared data, backing up critical data (e.g., by data mirroring), etc.

A network-based storage system typically includes at least one storage server, which is a processing system configured to store and retrieve data on behalf of one or more client processing systems ("clients"). In the context of NAS, a storage server may be a file server, which is sometimes called a "filer". A filer operates on behalf of one or more clients to store and manage shared files. The files may be stored in a storage subsystem that includes one or more arrays of mass storage devices, such as magnetic or optical disks or tapes, by using RAID (Redundant Array of Inexpensive Disks). Hence, the mass storage devices in each array may be organized into one or more separate RAID groups.

In a SAN context, a storage server provides clients with block-level access to stored data, rather than file-level access. Some storage servers are capable of providing clients with both file-level access and block-level access, such as Filers made by Network Appliance, Inc. (NetApp®) of Sunnyvale, Calif.

In file servers, data is stored in logical containers called volumes, which may be identical with, or subsets of, aggregates. An "aggregate" is a logical container for a pool of storage, combining one or more physical mass storage devices (e.g., disks) or parts thereof into a single logical storage object, which contains or provides storage for one or more other logical data sets at a higher level of abstraction (e.g., volumes). A "volume" is a set of stored data associated with a collection of mass storage devices, such as disks, which obtains its storage from (i.e., is contained within, and may be coextensive with) an aggregate, and which is managed as an independent administrative unit, such as a complete file system. A "file system" is an independently managed, self-contained, hierarchal set of data units (e.g., files, blocks or Logical Unit Numbers). Although a volume or file system (as those terms are used herein) may store data in the form of files, that is not necessarily the case. That is, a volume or file system may store data in the form of other units, such as blocks or Logical Unit Numbers (LUNs).

One feature which is useful to have in a storage server is the ability to create a read-only, persistent, point-in-time image (RPPI) of a data set, such as a volume or a LUN, including its metadata. This capability allows the exact state of the data set to be restored from the RPPI in the event of, for example, data corruption or accidental data deletion. The ability to restore data from an RPPI provides administrators with a simple mechanism to revert the state of their data to a known previous point in time as captured by the RPPI. Typically, creation of an RPPI or restoration from an RPPI can be controlled from a client-side software tool. An example of an implementation of an RPPI is a Snapshot™ generated by SnapDrive™. Snap-Drive is made by NetApp. Unlike other RPPI implementations, NetApp Snapshots do not require duplication of data blocks in the active file system, because a Snapshot can include pointers to data blocks in the active file system, for any blocks that have not been modified since the Snapshot was created. The "active" file system is the current working file system, where data may be modified or deleted, as opposed to an RPPI, which is a read-only copy of the file system saved at a specific time An example of an RPPI technique which does not require duplication of data blocks to create an RPPI is described in U.S. Pat. No. 5,819,292, which is incorporated herein by reference, and which is assigned to NetApp. The described technique of creating an RPPI (e.g., a Snapshot) does not require duplication of data blocks in the active file system, because the Snapshot can include pointers to data blocks in the active file system, for any blocks that have not been modified since the RPPI was created. (The term "Snapshot" is used in this document without derogation of Network Appliance, Inc.'s trademark rights.) Among other advantages, this technique allows an RPPI to be created quickly, helps to reduce consumption of storage space by RPPIs, and reduces the need to repeatedly update data block pointers as required in some prior art RPPI techniques.

In some instances, it may be desirable to write data to an RPPI. For example, when an RPPI of a dataset (e.g., an active file system, a LUN, etc.) is mounted as a Windows drive for verification purposes, Windows must write file system specific metadata information to the RPPI. One way to achieve this is to use a technique described in U.S. patent application Ser. No. 10/412,478 entitled "Writable Read Only Snapshots", by Vijayan Rajan and filed on Apr. 11, 2003. A writeable, read-only Snapshot comprises a read-only Snapshot and a writeable virtual disk file (hereinafter "vdisk") residing in the active file system. The vdisk is a "shadow" image of the Snapshot and, as such, includes an attribute that specifies the Snapshot to be used as the base. A write operation directed to the writeable read-only Snapshot is "trapped", such that the data associated with the operation is stored in the vdisk in the active file system.

The writeable, read-only Snapshot technique, however, creates at least one problem for storage management tasks. Because the vdisk is created and stored in the active file system, any later-created Snapshot of the active file system will reference the vdisk since it is a part of the active file system. As a result, the later created Snapshot indirectly references the base Snapshot of the writeable, read-only Snapshot. Thus, as long as the later created Snapshot is not deleted, the base Snapshot cannot be removed even when the vdisk has been already deleted. In addition, with more writeable, read-only Snapshots and more regular Snapshots being created, an interdependency relationship is created among these Snapshots, making the management of the Snapshots a complicated task.

Further, the writeable, read-only Snapshot technique is not applicable when the whole file system, including the active file system, is read-only. For example, in a storage mirroring system, the mirror of the source file system is not modifiable unless the modification is for data synchronization between the source file system and the mirror. Therefore, a vdisk cannot be written into the mirror for the purpose of making a Snapshot of the mirror writeable. As a result, the writeable, read-only Snapshot technique does not work in this scenario.

SUMMARY OF THE INVENTION

The present invention includes a method to make a mirror of a source file system appear from a client's perspective modifiable independently. The method includes maintaining data consistency between a source file system and a mirror of the source file system by preventing the mirror from being modified independently. The method further includes creating a writeable clone of the mirror such that the mirror may appear from a client's perspective to be modifiable independently by using the writeable clone, yet without breaking data consistency between the source file system and the mirror.

The present invention also includes a method to make a read-only persistent point-in-time image (RPPI) of a file system appear from a client's perspective writeable. The method includes maintaining a file system, the file system having an active file system and a first read-only persistent point-in-time image (RPPI) of the active file system. The method also includes creating a writeable clone of the first RPPI such that the first RPPI may appear to be writeable from a client's perspective by using the writeable clone, the writeable clone referencing at least part of the first RPPI. The method further includes preventing any newly created RPPI of the active file system from referencing the first RPPI by storing the writeable clone outside the active file system.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and system for making a read-only file system appear to be writeable are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Figure 1:
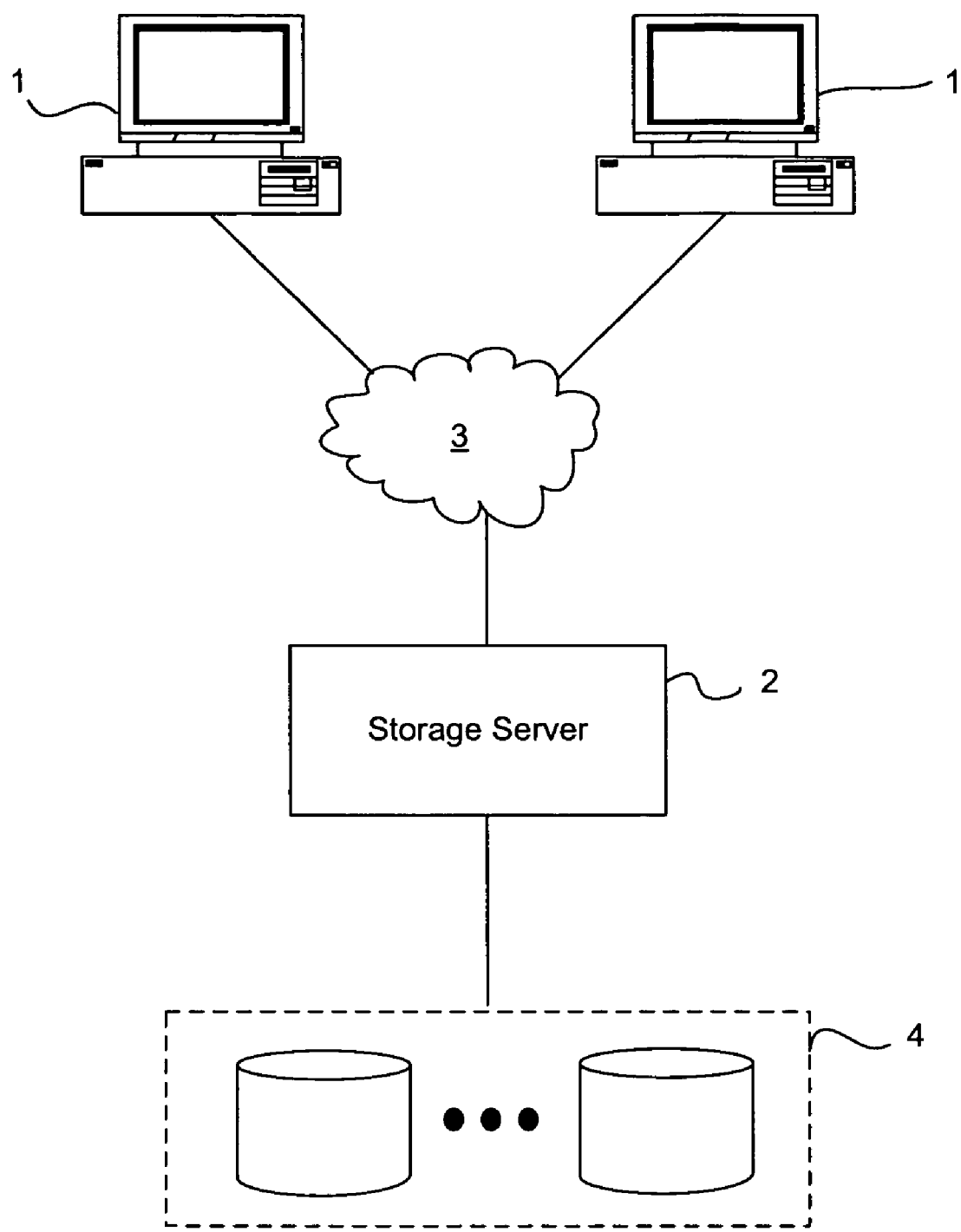
FIG. 1 illustrates a network environment in which the present invention may be implemented.

FIG. 1 shows an example of a network environment in which the present invention may be implemented. A storage server 2 is coupled locally to a storage subsystem 4, which includes multiple mass storage devices (e.g., disks). The storage server 2 is also coupled through a network 3 to a number of storage clients 1 (hereinafter simply "clients"). The storage subsystem 4 is managed by the storage server 2. The storage server 2 receives and responds to various read and write requests from the clients 1, relating to volumes, LUNs, files, and/or other units of data stored in (or to be stored in) the storage subsystem 4.

Each of the clients 1 may be, for example, a conventional personal computer (PC), server-class computer, workstation, or the like. The storage server 2 may be, for example, a file server used in a NAS mode (a "filer"), a block-based storage server such as used in a storage area network (SAN), a storage server which can perform both file-level access and block-level access for clients, or another type of storage server. The network 3 may be, for example, a local area network (LAN), a metropolitan area network (MAN), a wide area network (WAN), a global area network (GAN) such as the Internet, or other type of network or combination of networks. The network 3 may implement, for example, Ethernet protocol, Fibre Channel protocol (FCP), or another protocol or a combination of protocols.

The storage subsystem 4 may store data represented in an active file system of the storage server 2, and one or more RPPIs. The mass storage devices in the storage subsystem 4 may be, for example, conventional magnetic disks, optical disks such as CD-ROM or DVD based storage, magneto-optical (MO) storage, or any other type of non-volatile storage devices suitable for storing large quantities of data. The storage devices in the storage subsystem 4 can be organized as one or more RAID groups, in which case the storage server 2 accesses the storage subsystem 4 using an appropriate RAID protocol.

Figure 2:
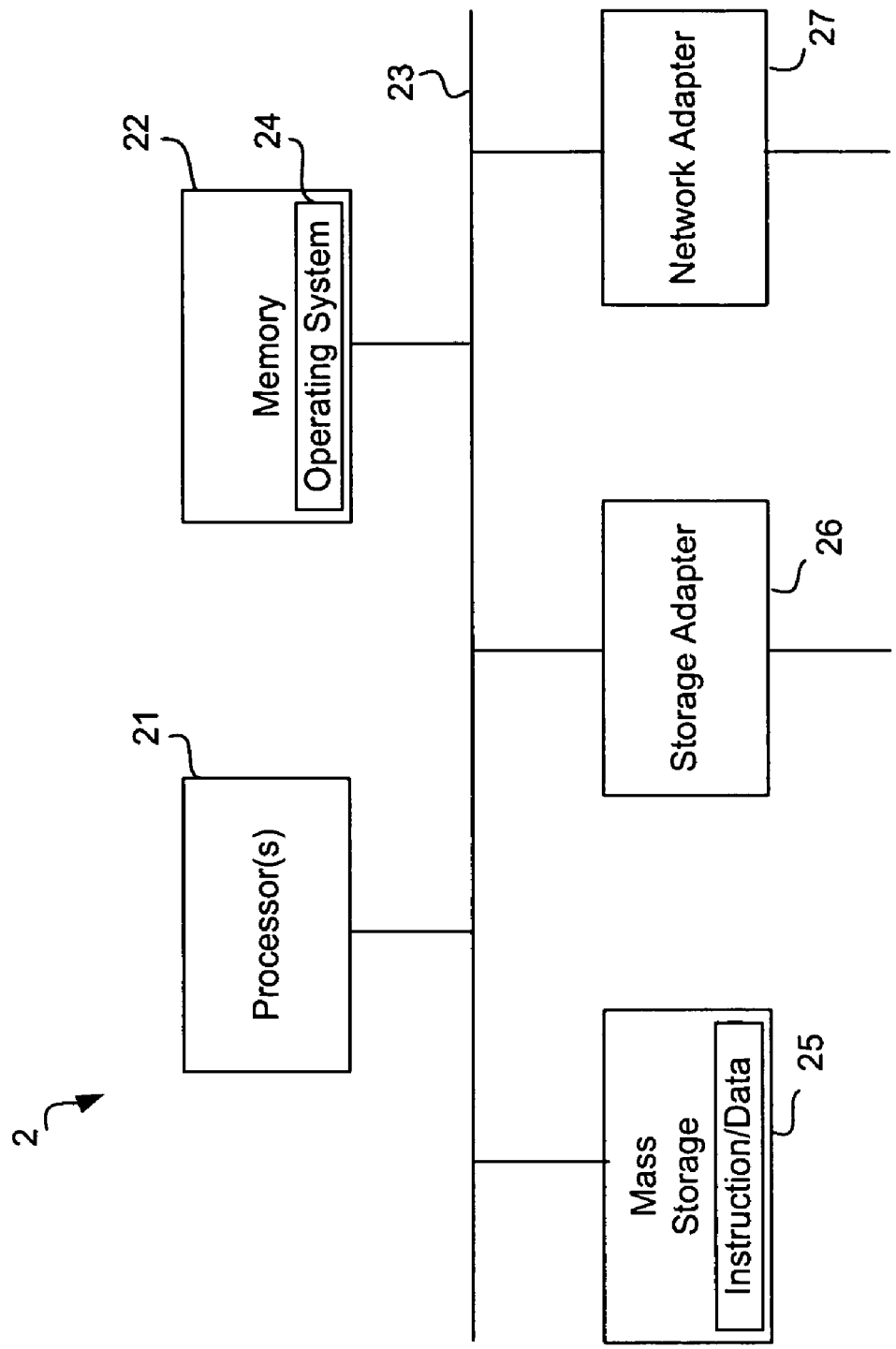
FIG. 2 illustrates a high-level block diagram of a storage server.

FIG. 2 is a high-level block diagram of the storage server, on which the present invention may be implemented. Certain standard and well-known components which are not germane to the present invention are not shown. The storage server 2 includes one or more processors 21 coupled to a bus system 23.

The bus system 23 in FIG. 2 is an abstraction that represents any one or more separate physical buses and/or point-to-point connections, connected by appropriate bridges, adapters and/or controllers. The bus system 23, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 21 are the central processing units (CPUs) of the storage server 2 and, thus, control the overall operation of the storage server 2. In certain embodiments, the processors 21 accomplish this by executing software stored in memory 22. A processor 21 may be, or may include, one or more programmable general-purpose or special-purpose microprocessors, digital signal processors (DSPs), programmable controllers, application specific integrated circuits (ASICs), field-programmable gate arrays (FPGAs), programmable logic devices (PLDs), or the like, or a combination of such devices.

The storage server 2 also includes memory 22 coupled to the bus system 23. The memory 22 represents any form of random access memory (RAM), read-only memory (ROM), flash memory, or a combination thereof. Memory 22 stores, among other things, the operating system 24 of the storage server 2, in which the processes discussed above can be implemented.

Also connected to the processors 21 through the bus system 23 are a mass storage device 25, a storage adapter 26, and a network adapter 27. Mass storage device 25 may be or include any conventional medium for storing large quantities of data in a non-volatile manner, such as one or more disks. The storage adapter 26 allows the storage server 2 to access the storage subsystem 4 which maintains the file system(s) and may be, for example, a Fibre Channel adapter or a SCSI adapter. The network adapter 27 provides the storage server 2 with the ability to communicate with remote devices such as the clients 1 over a network and may be, for example, an Ethernet adapter or a Fibre Channel adapter.

Memory 22 and mass storage device 25 store software instructions and/or data, which may include instructions and/or data used to implement the techniques introduced here. These instructions and/or data may be implemented as part of the operating system 24 of the storage server 2.

Figure 3:
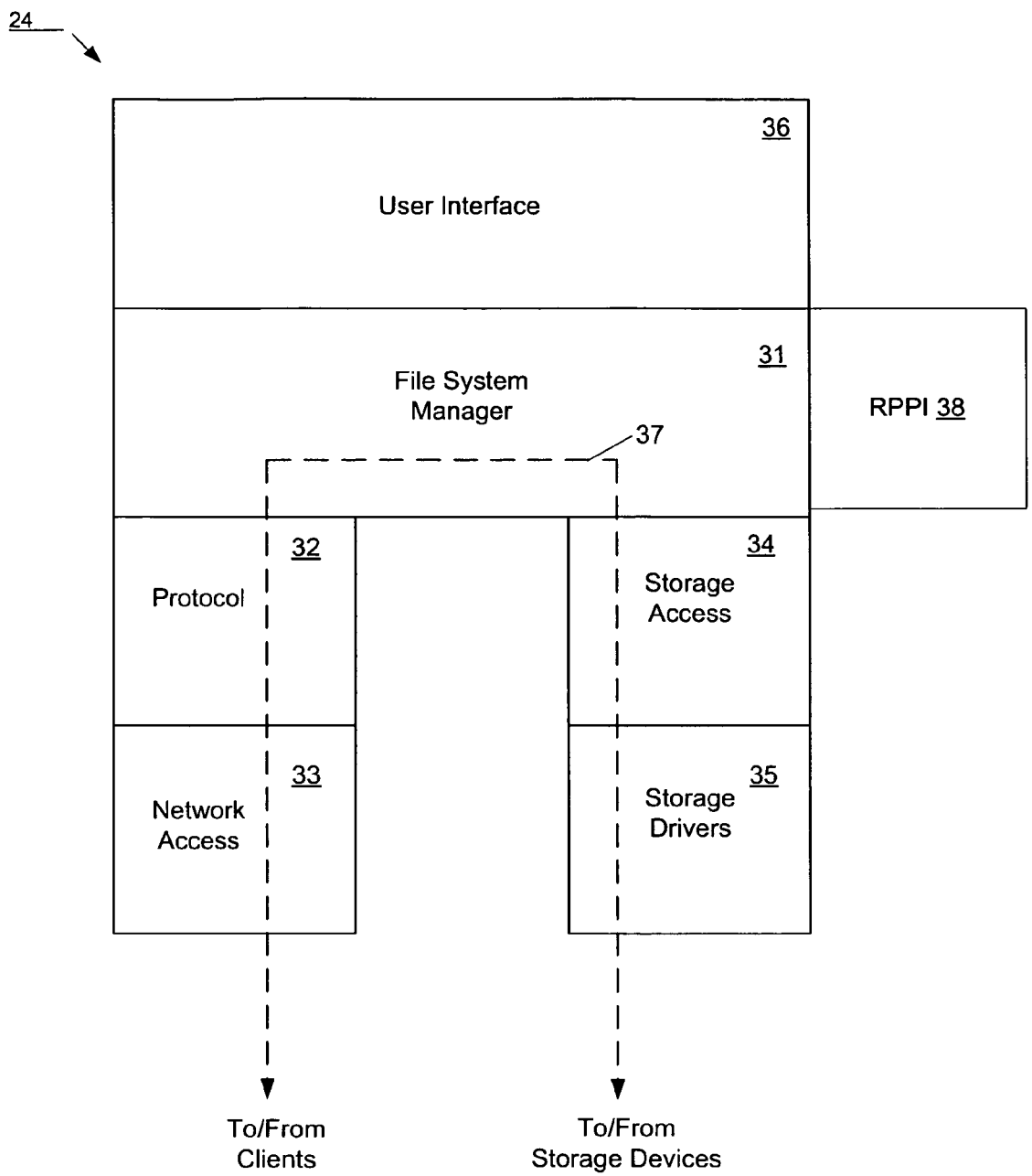
FIG. 3 illustrates the operating system of a storage server.

FIG. 3 illustrates the operating system 24 of the storage server 2. The operating system 24 can include several modules, or layers. These layers include a file system manager 31. The file system manager 31 is an application-level programmatic entity which imposes a structure (e.g. hierarchical) on volumes, files, directories and/or other data containers stored and/or managed by a storage server 2, and which services read/write requests from clients of the storage server. An example of a file system manager which has this functionality is the write anywhere file layer (WAFL) file system software that is part of the Data ONTAP® storage operating system from NetApp.

Logically under the file system manager 31, the operating system 24 also includes a network layer 32 and an associated network media access layer 33, to allow the storage server 2 to communicate over a network (e.g., with clients 1). The network 32 layer implements various protocols, such as NFS, CIFS, HTTP, SNMP, and TCP/IP. The network media access layer 33 includes one or more drivers which implement one or more protocols to communicate over the interconnect 3, such as Ethernet or Fibre Channel. Also logically under the file system manager 31, the operating system 24 includes a storage access layer 34 and an associated storage driver layer 35, to allow the storage server 2 to communicate with the storage subsystem 4. The storage access layer 34 implements a storage redundancy protocol, such as RAID-4 or RAID-5, while the storage driver layer 35 implements a lower-level storage device access protocol, such as Fibre Channel or SCSI. Reference numeral 37 in FIG. 3 shows the data access path through the operating system 24, associated with servicing read and write requests from clients.

The operating system 24 may also include an RPPI layer 38, which interfaces with the file system manager 31 and external RPPI client software, to allow creation of RPPIs and restoration of data from RPPIs. The operating system 24 may further include a user interface layer 36, which implements a graphical user interface (GUI) and/or a command line interface (CLI), for example, such as for purposes of administrative access to the storage server 2.

Figure 4:
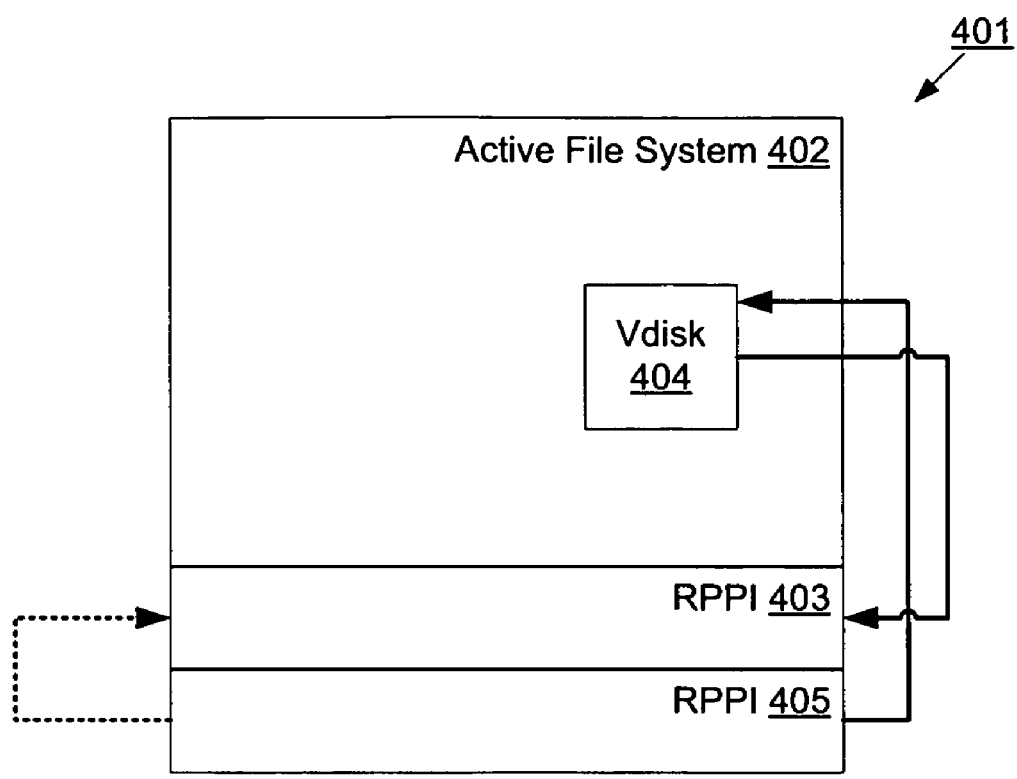
FIG. 4 is a block diagram illustrating an example of making an RPPI of a file system appear to be writeable according to a prior art mechanism.

FIG. 4 is a block diagram illustrating an example of making an RPPI of a file system appear to be writeable according to a prior art mechanism. In the present application, the term "appear" means observing or appearing from a client's perspective. A client may be a user, a program, etc. When a write, delete, or modify operation on an RPPI or a read-only file system is issued, some work is done to carry out the operation and to record the operation's result persistently, but the actual RPPI or the read-only file system is not physically changed.

As shown in FIG. 4, the file system 401 includes an active file system 402. The file system 401 includes an RPPI 403 of the active file system 402. According to the writeable, read-only Snapshot technique discussed in the background section of this application, in order to make the RPPI 403 appear to be writeable, a vdisk 404 is created in the active file system. The vdisk 404 is linked to the RPPI 403 such that any data attempted to be written into the RPPI 403 is actually written into the vdisk 404. Because of the link between vdisk 404 and the RPPI 403, RPPI 403 cannot be removed from the file system 401 unless vdisk 404 is removed first, thus, the link creates a dependency on the RPPI 403 by the vdisk 404. The file system 401 also includes a second RPPI 405 of the active file system 402. Assuming the RPPI 405 is created later than the creation of RPPI 403 and the vdisk 404, then the RPPI 405 references the vdisk 404, because vdisk 404 is a part of the active file system 402. Thus, the later created RPPI 405 indirectly references the RPPI 403. As a result, the RPPI 405 also depends on the RPPI 403. Even assuming the vdisk 404 is removed from the active file system 402 now, the RPPI 403 still cannot be removed because the RPPI 405 is depending on it. This interdependency could grow more complicated with the creation of more RPPIs.

Figure 5:
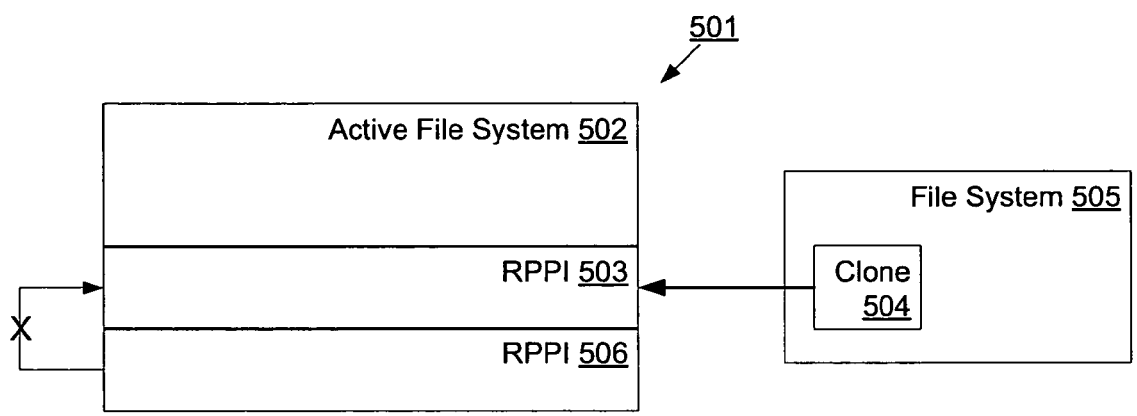
FIG. 5 is a block diagram illustrating an example of making an RPPI of a file system appear to be writeable according to an embodiment of the present invention.

FIG. 5 is a block diagram illustrating an example of making an RPPI of a file system appear to be writeable according to an embodiment of the present invention. As shown in FIG. 5, a file system 501 includes an active file system 502 and an RPPI 503 of the active file system 502. In order to make the RPPI 503 appear to be writeable, a writeable clone 504 of the RPPI 503 is created on a separate file system 505. A clone of a dataset (e.g., an RPPI, a file system, etc.) is an exact copy of the dataset. In one embodiment, the clone is created without duplicating the data blocks of the source dataset, but by sharing the data blocks by including pointers to these data blocks in the clone. A user may make any change on the clone, yet the source dataset remains intact because whenever the change is targeted to a shared data block, a new data block is used to hold the change instead of overwriting the original shared data block. The above described block sharing technology may be implemented in a write out-of-place file system. In a "write-out-of-place" file system, whenever a data block is modified, it is written to a new physical location on disk. This is in contrast with a "write-in-place" approach, where a data block, when modified, is written in its modified form back to the same physical location on disk. The block sharing technology may also be implemented in other types of file systems as long as it is implemented according to the above described principle, as illustrated in FIG. 5. An example of a technology that allows creation of a writeable clone of a file system is NetApp's FlexClone™ technology, which allows creating a clone of a dataset without duplicating the data blocks of the dataset, but sharing the data blocks by including pointers to these data blocks. The FlexClone technology is described in U.S. Patent Application Pub. No. US 2005/0246397, which is assigned to NetApp, and which is incorporated herein by reference.

By creating the clone 504 of the RPPI 503 on a separate file system 505, a later created RPPI 506 of the active file system 502 will not include any reference to the clone 504. Thus, unlike the scenario depicted in FIG. 4, no interdependency between the RPPI 506 and the RPPI 503 is created. In an exemplary embodiment, the RPPI 503 comprises a first RPPI and the RPPI 506 comprises a second RPPI. However, it will be appreciated that the terms "first" and "second" in the present application are used to distinguish the different RPPIs or other entities (file systems, for example). The terms are used for illustration purposes, not restriction purposes.

Figure 6:
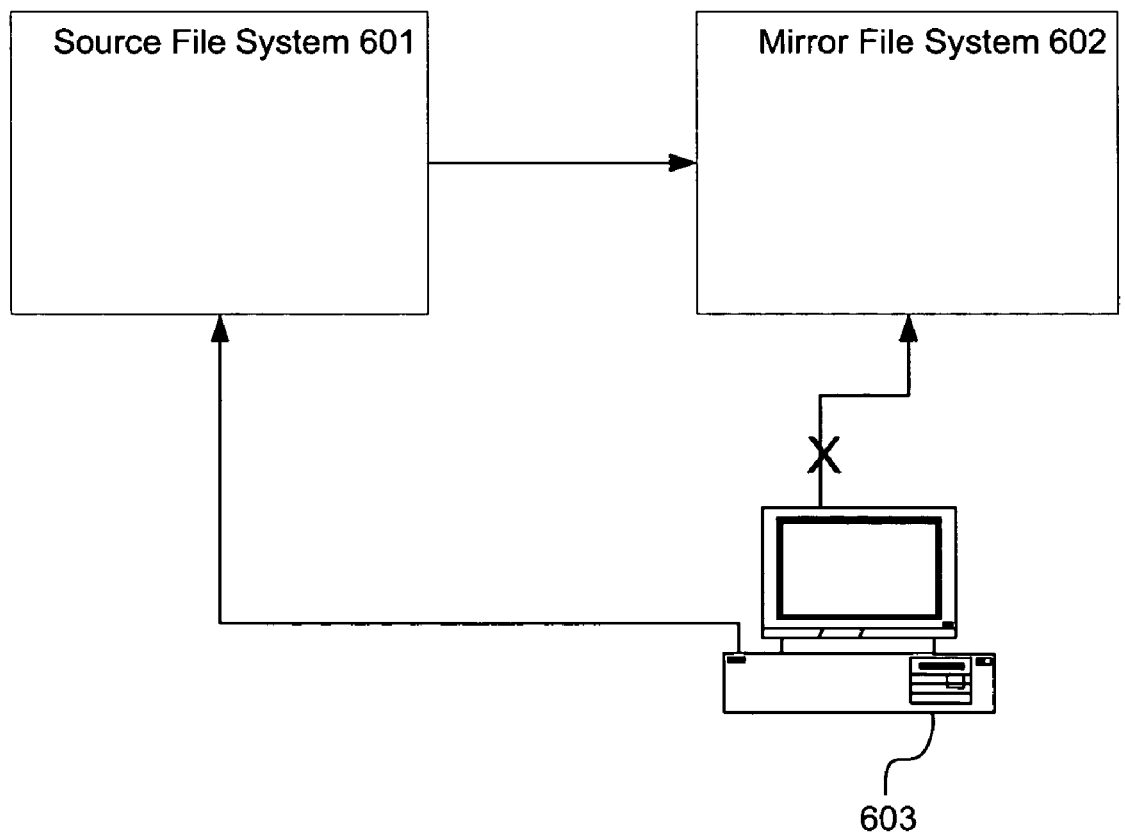
FIG. 6 is a block diagram illustrating a prior art mirroring mechanism.

FIG. 6 is a block diagram illustrating a prior art mirroring mechanism. In order to keep the data of a mirror 602 consistent with the data of a source file system 601, the mirror 602 is periodically updated to reflect any changes on the source file system 601 since the mirror 602's last update. Generally, before the mirror 602 is updated to maintain consistency with the source file system 601. A read-only, persistent point-in-time image (RPPI) of the source file system 601 is created and used as a base for updating the mirror 602. The RPPI may be used for any later verification of whether the mirror 602 is still consistent with the RPPI. The mirror 602, however, may not be changed independently of the source file system 601. In other words, the mirror 602 may not be modified or updated except for the purpose of synchronizing its data to keep the data consistent with the source file system 601. Thus, unless the modification to the mirror 602 is to keep the data consistency between the source file system and the mirror, the mirror is not writeable. For example, as shown in FIG. 6, a client 603 may not directly change the mirror 602. However, the client 603 may change the source file system 601. Then an update of the mirror 602 to synchronize its data with the source file system 601 reflects the change made by the client 603. A mirroring relationship is maintained between a source file system and the mirror of the source file system as long as the mirror is consistent with the base RPPI of the source file system 601 based on which the mirror 602 has been updated most recently. On the other hand, as soon as the mirror is modified independent of the source file system, the mirror 602 is inconsistent with the base RPPI of the source file system 601, in which case, the mirroring relationship between the source file system and the mirror is broken.

Figure 7:
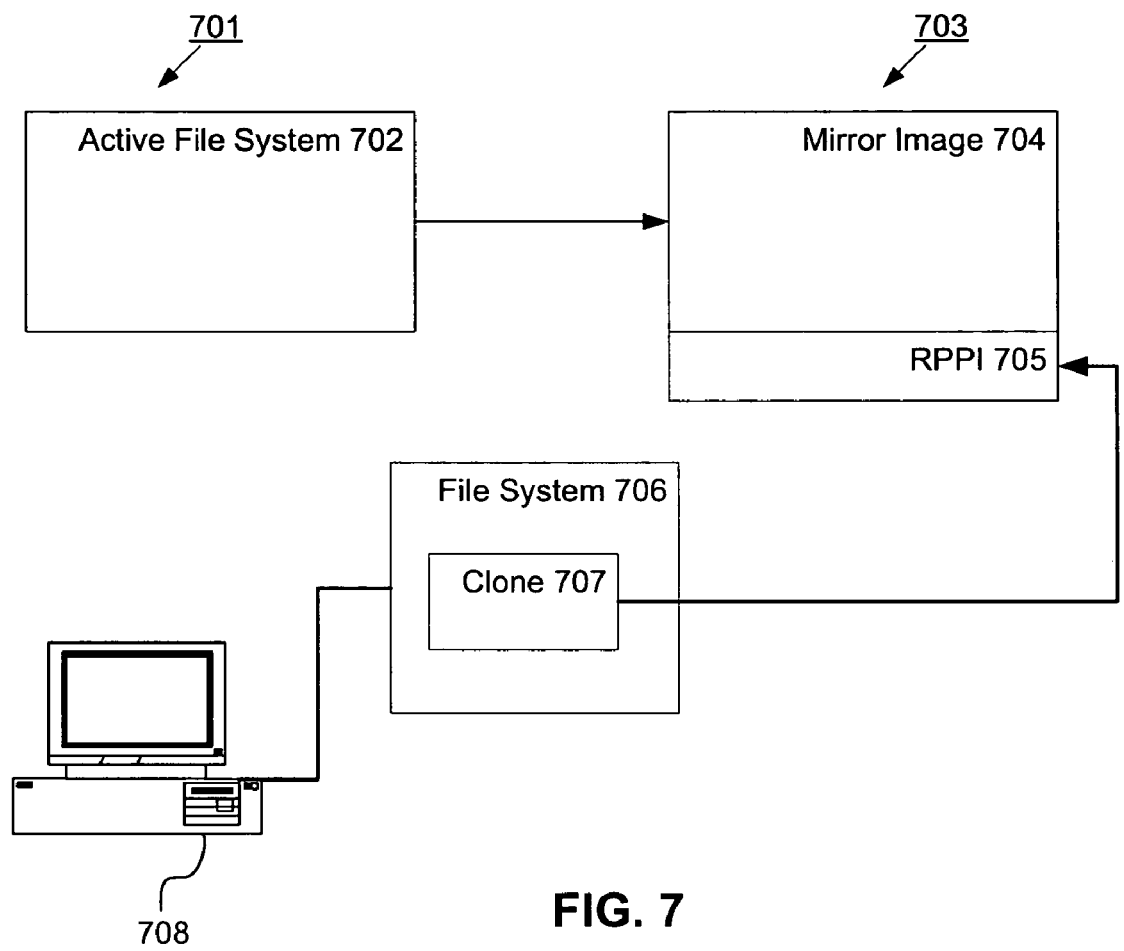
FIG. 7 is a block diagram illustrating a method of making a mirror of a source file system appear to be modifiable independently, yet without breaking the data consistency between the mirror and the source file system.

FIG. 7 is a block diagram illustrating a method of making a mirror of a source file system appear to be modifiable independently of the source file system, yet without breaking data consistency between the source file system and the mirror. As shown, the source file system 701 includes an active file system 702. The mirror 703 of the source file system 701 includes a mirror image 704 of the active file system 702. In one embodiment, the mirror 703 includes an RPPI 705 of the mirror image 704. The RPPI 705 may be created during a scheduled job for mirror synchronization. Alternatively, the RPPI 705 may be a mirror image of an RPPI stored in the source file system 701. In either case, the RPPI 705 holds a persistent point-in-time image of the mirror image 704. To make the RPPI 705 of the mirror image 704 appear to be modifiable independently of the source file system 701, a writeable clone 707 of the RPPI 705 is created in a separate file system 706. A client 708 may initiate any operation, e.g., read, write, modify, delete, etc., to the mirror. These operations are then carried out on the writeable clone 707 such that it appears to the client 708 as if these operations are carried out on the mirror image 704. Because no change is actually made to the mirror 703, the data consistency between the mirror 703 and the source file system 701 is not broken. In one embodiment, the writeable clone 707 is created by applying the FlexClone technology mentioned above. Advantages of applying the FlexClone technology include saving time and space in creating the clone.

Thus, a method and system for making a read-only file system appear to be writeable have been described.

Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

"Logic", as is used herein, may include, for example, software, hardware and/or combinations of hardware and software.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
    maintaining a mirroring relationship between an active file system and a mirror of the active file system by preventing the mirror from being modified independently of the active file system; and
    creating a writeable clone of the mirror such that the mirror appears from a client's perspective to be modifiable independently of the active file system by using the writeable clone, but without breaking the mirroring relationship between the active file system and the mirror, wherein the writeable clone is stored on a file system different than the active file system.

2. The method of claim 1, wherein the mirror is stored as a plurality of data blocks, the writeable clone of the mirror including one or more pointers that reference at least some of the plurality of data blocks.

3. The method of claim 2, wherein the active file system comprises a first file system, the mirror comprises a second file system and the writeable clone is stored in a third file system.

4. The method of claim 3, wherein the active file system, the mirror and the third file system each comprises a separate volume.

5. The method of claim 1, wherein the client is a computer program.

6. The method of claim 1, wherein the client is a user.

7. A machine-readable storage medium having sequences of instructions stored therein which, when executed by a processor of a computer, cause the processor to perform a process comprising:
    maintaining a mirroring relationship between an active file system and a mirror of the active file system by preventing the mirror from being modified independently of the active file system, wherein the mirror is stored as a plurality of data blocks; and
    creating a writeable clone of the mirror such that the mirror appears from a client's perspective to be modifiable independently of the active file system by using the writeable clone, but without breaking the mirroring relationship between the active file system and the mirror, wherein the writeable clone of the mirror is stored on a file system different than the active file system and includes one or more pointers that reference at least some of the plurality of data blocks.

8. The machine-readable storage medium of claim 7, wherein the active file system comprises a first file system, the mirror comprises a second file system and the writeable clone is stored in a third file system.

9. The machine-readable storage medium of claim 8, wherein the active file system, the mirror and the third file system each comprises a separate volume.

10. The machine-readable storage medium of claim 7, wherein the client is a computer program.

11. The machine-readable storage medium of claim 7, wherein the client is a user.

12. A storage server comprising:
a processor;
a network interface through which to communicate with a client;
a storage interface through which to access a plurality of mass storage devices on behalf of the client; and
a memory coupled to the processor, the memory storing instructions which, when executed by the processor, cause the storage server to perform a process comprising:
maintaining a mirror of an active file system, the mirror stored as a plurality of data blocks;
maintaining a mirroring relationship between the active file system and the mirror by preventing the mirror from being modified independently of the active file system; and
creating a writeable clone of the mirror such that the mirror appears from the client's perspective to be modifiable independently of the active file system by using the writeable clone, but without breaking the mirroring relationship between the active file system and the mirror, wherein the writeable clone of the mirror is stored on a file system different than the active file system and includes one or more pointers that reference at least some of the plurality of data blocks.

13. The storage server of claim 12, wherein the active file system comprises a first file system, the mirror comprises a second file system and the writeable clone is stored in a third file system.

14. The storage server of claim 13, wherein the active file system, the mirror and the third file system each comprises a separate volume.

15. A method comprising:
maintaining a mirror of an active file system, wherein the mirror is only modified to keep data consistency between the mirror and the active file system; and
creating a writeable clone of the mirror such that the mirror appears from a client's perspective to be modifiable for purposes other than keeping data consistency between the mirror and the active file system, wherein the writeable clone is stored on a file system different than the active file system.

16. The method of claim 15, wherein the mirror is stored as a plurality of data blocks, the writeable clone of the mirror including one or more pointers that reference at least some of the plurality of data blocks.

17. The method of claim 16, wherein the active file system comprises a first file system, the mirror comprises a second file system and the writeable clone is stored in a third file system.

18. The method of claim 17, wherein the active file system, the mirror and the third file system each comprises a separate volume.

19. The method of claim 18, wherein the client is a computer program.

20. The method of claim 18, wherein the client is a user.

* * * * *